US008970200B2

(12) United States Patent
Hussain et al.

(10) Patent No.: US 8,970,200 B2
(45) Date of Patent: Mar. 3, 2015

(54) SYSTEMS AND METHODS FOR LIGHT-LOAD EFFICIENCY IN DISPLAYS

(71) Applicant: Apple Inc., Cupertino, CA (US)

(72) Inventors: Asif Hussain, San Jose, CA (US); Jingdong Chen, San Jose, CA (US); Manisha P. Pandya, Sunnyvale, CA (US); Mohammad J. Navabi-Shirazi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/673,695

(22) Filed: Nov. 9, 2012

(65) Prior Publication Data

US 2014/0132641 A1 May 15, 2014

(51) Int. Cl.
*H02M 3/158* (2006.01)
*H02M 3/04* (2006.01)
*G09G 5/10* (2006.01)

(52) U.S. Cl.
CPC .......... *G09G 5/10* (2013.01)
USPC .......... 323/285; 345/102; 345/211; 345/82; 323/283; 323/284

(58) Field of Classification Search
CPC ..... H02M 3/156; H02M 3/157; H02M 3/158; H02M 3/1588; G09G 3/3406; G09G 2360/16; G09G 2320/0626; G09G 2320/064; H05B 33/0818; H05B 33/0851
USPC .......... 323/282–285, 265, 271, 351; 345/690, 345/102; 315/307
See application file for complete search history.

(56) References Cited

U.S. PATENT DOCUMENTS

| | | | | |
|---|---|---|---|---|
| 7,358,679 | B2 | 4/2008 | Lys et al. | |
| 7,372,240 | B2 * | 5/2008 | Khayat et al. | 323/283 |
| 7,439,944 | B2 | 10/2008 | Huynh et al. | |
| 7,701,189 | B2 * | 4/2010 | Gehrke | 323/285 |
| 8,289,234 | B2 | 10/2012 | Kim | |
| 2004/0208011 | A1 * | 10/2004 | Horiuchi et al. | 362/458 |
| 2008/0203991 | A1 * | 8/2008 | Williams | 323/288 |
| 2008/0258697 | A1 * | 10/2008 | Gehrke | 323/283 |
| 2013/0342433 | A9 * | 12/2013 | Sankar et al. | 345/102 |

FOREIGN PATENT DOCUMENTS

| | | | |
|---|---|---|---|
| WO | 2012061999 | A1 | 5/2012 |

* cited by examiner

*Primary Examiner* — Quan-Zhen Wang
*Assistant Examiner* — Xuemei Zheng
(74) *Attorney, Agent, or Firm* — Fletcher Yoder PC

(57) ABSTRACT

Systems and methods for light-load efficiency in displays may include a backlight driver circuit that may adjust a gate drive voltage provided to a gate of a metal-oxide-semiconductor field-effect transistor (MOSFET) in the boost converter based on the load conditions of light-emitting diodes used to illuminate the display panel. The backlight driver circuit may also switch between two different voltage sources to further broaden a range of gate drive voltages available to drive the gate of the MOSFET in the boost converter. As a result, the backlight driver circuit may decrease gate drive losses associated with the MOSFET, thereby increasing the efficiency of the boost converter.

22 Claims, 8 Drawing Sheets

SYSTEMS AND METHODS FOR LIGHT-LOAD EFFICIENCY IN DISPLAYS

BACKGROUND

The present disclosure relates generally to systems and methods for improving the efficiency of a display panel, and more specifically, to improving the efficiency of a boost converter in the display panel while operating under light-load conditions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A backlight driver circuit in a light-emitting diode (LED) display may use a boost converter to provide a range of direct current (DC) voltages to a string of light-emitting diodes (LEDs) in the LED display. Generally, the string of LEDs provides various amounts of white light to the screen of the LED display such that the range of DC voltages corresponds to a range of brightness levels or white light provided to the screen. To control the range of voltages provided to the string of LEDs, the backlight driver circuit may use the boost converter to adjust (e.g., increase) an input voltage provided by a voltage supply and couple the adjusted voltage to the string of LEDs. Generally, the boost converter adjusts the voltage of the voltage supply by turning a switch (e.g., metal-oxide-semiconductor field-effect transistor) on and off such that an inductor coupled in series with the voltage supply and the string of LEDs may maintain a voltage, which may increase a total voltage available to the string of LEDs.

In conventional backlight driver circuits, the boost converter is configured to switch a metal-oxide-semiconductor field-effect transistor (MOSFET) using a fixed gate drive voltage to minimize a power loss in the MOSFET. That is, the backlight driver circuit may provide a fixed gate drive voltage to the gate of the MOSFET to switch the MOSFET off and on such that an on-resistance $R_{ds}$(on) between the drain and the source in the MOSFET is minimized, thereby decreasing conduction losses of the MOSFET due to the on-resistance $R_{ds}$(on). However, during light-load conditions, a large portion of the power loss of the MOSFET may no longer be attributed to the power lost via the on-resistance $R_{ds}$(on). Instead, during light-load conditions, a large portion of the power loss of the MOSFET may be attributed to driving the gate of the MOSFET when the MOSFET switches. As such, by using the fixed gated drive voltage for all load conditions (i.e., including light-load conditions), the boost converter may be less efficient due to the power loss via the gate of the MOSFET.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to systems and methods for improving the efficiency of a boost converter in the display panel while operating under light-load conditions.

In certain embodiments, a backlight driver circuit may adjust a gate drive voltage provided to a gate of a metal-oxide-semiconductor field-effect transistor (MOSFET) in the boost converter based on the load conditions of light-emitting diodes used to illuminate the display panel. Moreover, the backlight driver circuit may switch between two different voltage sources to further broaden a range of gate drive voltages available to drive the gate of the MOSFET in the boost converter. As a result, the backlight driver circuit may decrease gate drive losses associated with the MOSFET, thereby increasing the efficiency of the boost converter. For example, the backlight driver may use a low voltage power source (e.g., 5V) to provide a range of low voltages to the gate of the MOSFET during light-load conditions and may use a high voltage power source (e.g., 12V) to provide a range of higher voltages to the gate of the MOSFET during non-light load conditions. By using the low voltage source to provide low voltages to the MOSFET gate for light-load conditions, the backlight driver circuit may improve the efficiency of the boost converter by decreasing the power losses associated with gate drive of the MOSFET. That is, by using a lower gate drive voltage to switch the MOSFET during light-load conditions, the backlight driver circuit may decrease the gate drive losses of the MOSFET as compared to switching the MOSFET with a higher gate drive voltage.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to systems and methods for improving the efficiency of a boost converter in the display panel while operating under light-load conditions. Generally, conventional boost converters use a fixed gate drive voltage to switch a metal-oxide-semiconductor field-effect transistor (MOSFET) such that an on-resistance $R_{ds}$ (on) between the drain and the source in the MOSFET may be controlled (e.g., minimized). However, during light-load conditions, a large portion of power losses that occur in the boost converter may be attributed to a gate drive loss in the MOSFET of the boost converter. To decrease the gate drive loss in the MOSFET of the boost converter during light-load conditions, a backlight driver circuit may use lower gate drive voltages to switch the MOSFET.

Figure 1:
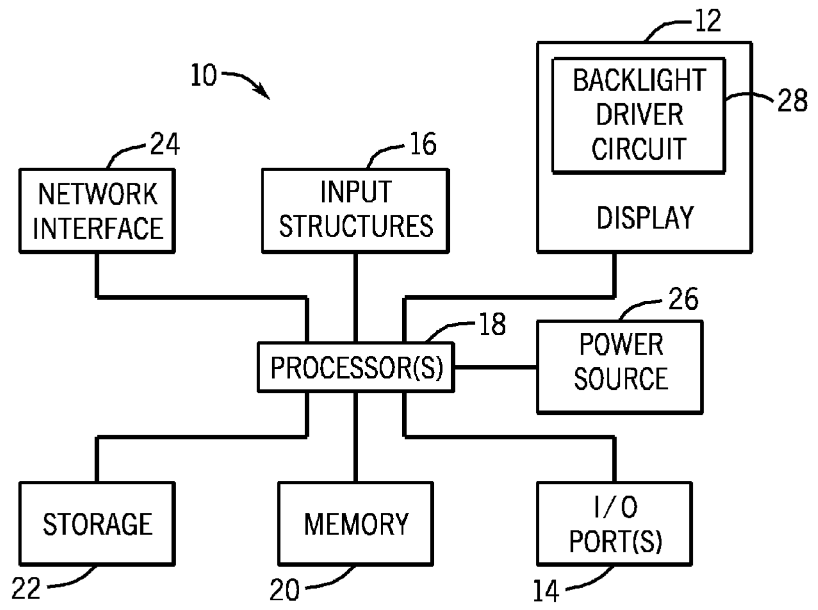
FIG. 1 is a block diagram of exemplary components of an electronic device, in accordance with an embodiment.

With this in mind, a variety of electronic devices may incorporate systems and methods for improving the efficiency of a boost converter in a display panel. An example of a suitable electronic device may include various internal and/or external components, which contribute to the function of the device. FIG. 1 is a block diagram illustrating the components that may be present in such an electronic device 10 and which may allow the electronic device 10 to function in accordance with the methods discussed herein. Those of ordinary skill in the art will appreciate that the various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in the electronic device 10. For example, in the presently illustrated embodiment, these components may include a display 12, I/O ports 14, input structures 16, one or more processors 18, a memory device 20, a non-volatile storage 22, a networking device 24, a power source 26, a backlight driver circuit 28, and the like.

With regard to each of these components, the display 12 may be used to display various images generated by the electronic device 10. Moreover, the display 12 may be a light-emitting diode (LED) display and may be a touch-screen display, for example, which may enable users to interact with a user interface of the electronic device 10. In some embodiments, the display 12 may be a MultiTouch™ display that can detect multiple touches at once.

The I/O ports 14 may include ports configured to connect to a variety of external I/O devices, such as a power source, headset or headphones, peripheral devices such as keyboards or mice, or other electronic devices 10 (such as handheld devices and/or computers, printers, projectors, external displays, modems, docking stations, and so forth).

The input structures 16 may include the various devices, circuitry, and pathways by which user input or feedback is provided to the processor 18. Such input structures 16 may be configured to control a function of the electronic device 10, applications running on the electronic device 10, and/or any interfaces or devices connected to or used by the electronic device 10.

The processor(s) 18 may provide the processing capability to execute the operating system, programs, user and application interfaces, and any other functions of the electronic device 10. The instructions or data to be processed by the processor(s) 18 may be stored in a computer-readable medium, such as the memory 20. The memory 20 may be provided as a volatile memory, such as random access memory (RAM), and/or as a non-volatile memory, such as read-only memory (ROM). The components may further include other forms of computer-readable media, such as the non-volatile storage 22, for persistent storage of data and/or instructions. The non-volatile storage 22 may include flash memory, a hard drive, or any other optical, magnetic, and/or solid-state storage media. The non-volatile storage 22 may be used to store firmware, data files, software, wireless connection information, and any other suitable data. In certain embodiments, the processor 18 may control the operation of various switches and hardware components that may be located within the electronic device 10 including the backlight driver circuit 28.

The network device 24 may include a network controller or a network interface card (NIC). Additionally, the network device 24 may be a Wi-Fi device, a radio frequency device, a Bluetooth® device, a cellular communication device, or the like. The network device 24 may allow the electronic device 10 to communicate over a network, such as a Local Area Network (LAN), Wide Area Network (WAN), or the Internet. The power source 26 may include a variety of power types such as a battery or AC power.

The backlight driver circuit 28 may be used to control an amount of white light or brightness level that may be produced by a number of light-emitting diodes (LEDs) in the display 12. As such, the backlight driver circuit 28 may alter a direct current (DC) voltage provided to the LEDs using a boost converter within the display 12. Additional details with regard to the backlight driver circuit 28 will be described below with reference to FIG. 4.

Figure 2:
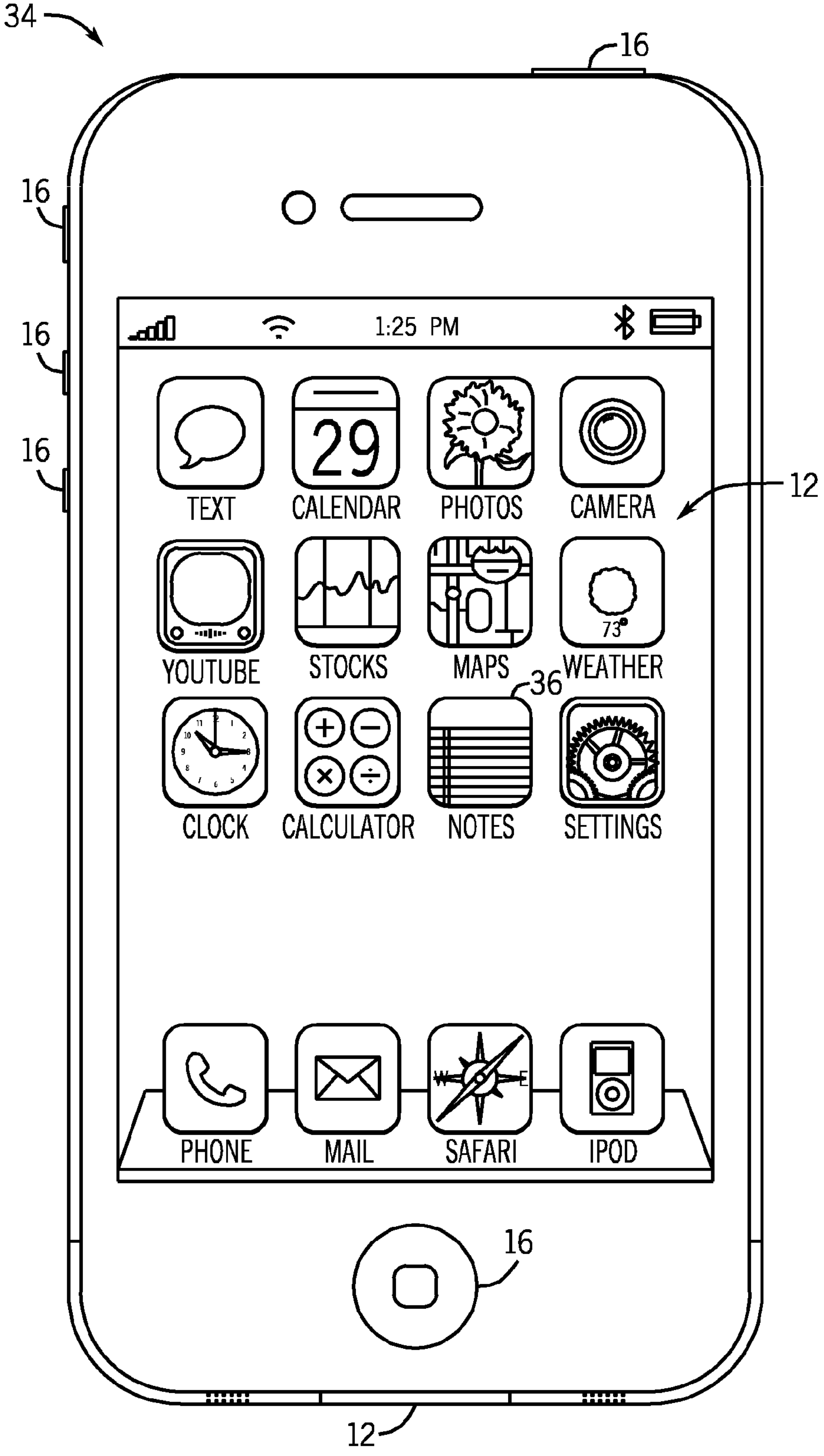
FIG. 2 is a front view of a handheld electronic device, in accordance with an embodiment.

With the foregoing in mind, FIG. 2 illustrates an electronic device 10 in the form of a handheld device 34 and a tablet device 40, respectively. FIG. 2 illustrates a cellular telephone, but it should be noted that while the depicted handheld device 34 is provided in the context of a cellular telephone, other types of handheld devices (such as media players for playing music and/or video, personal data organizers, handheld game platforms, tablet devices, and/or combinations of such devices) may also be suitably provided as the electronic device 10. As discussed with respect to the general electronic device 10 of FIG. 1, the handheld device 34 may allow a user to connect to and communicate through the Internet or through other networks, such as local or wide area networks. The handheld electronic device 34 may also communicate with other devices using short-range connections, such as Bluetooth® and near field communication. By way of example, the handheld device 34 may be a model of an iPod®, iPhone®, or iPad® available from Apple Inc. of Cupertino, Calif.

The handheld device 34 may include an enclosure or body that protects the interior components from physical damage and shields them from electromagnetic interference. The enclosure may be formed from any suitable material such as plastic, metal or a composite material and may allow certain frequencies of electromagnetic radiation to pass through to wireless communication circuitry within the handheld device 34 to facilitate wireless communication. In the depicted embodiment, the enclosure includes user input structures 16 through which a user may interface with the device. Each user input structure 16 may be configured to help control a device function when actuated.

In the depicted embodiment, the handheld device 34 includes the display 12. The display 12 may be a touch-screen LED display used to display a graphical user interface (GUI) that allows a user to interact with the handheld device 34. The handheld electronic device 34 also may include various input and output (I/O) ports that allow connection of the handheld device 34 to external devices.

Figure 3:
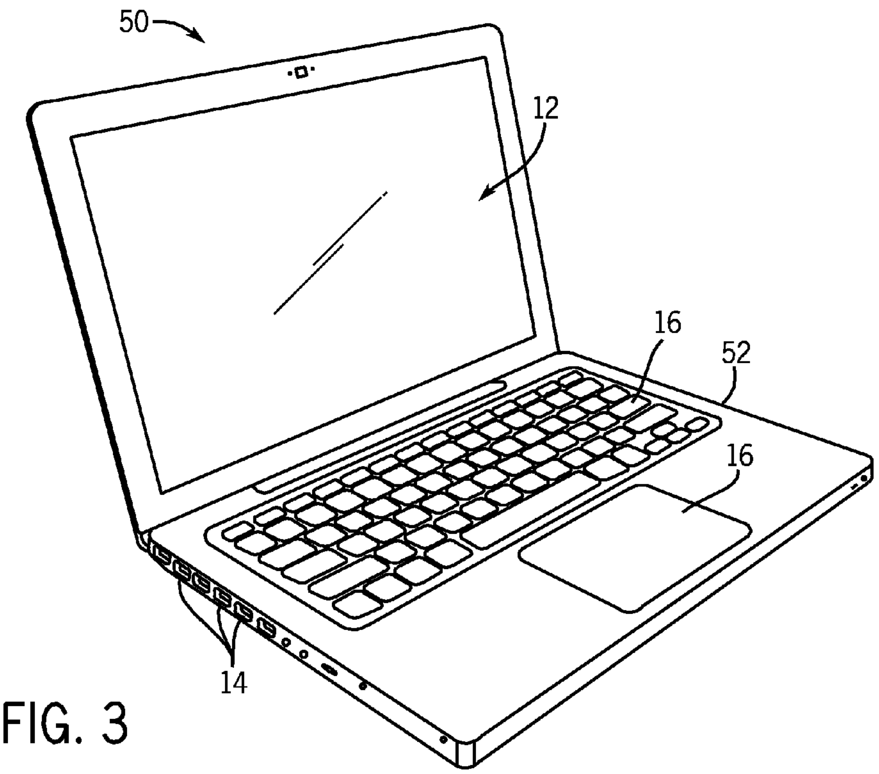
FIG. 3 is a view of a computer, in accordance with an embodiment.

In addition to handheld device 34, the electronic device 10 may also take the form of a computer or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, iPad® or Mac Pro® available from Apple Inc. By way of example, an electronic device 10 in the form of a laptop computer 50 is illustrated in FIG. 3 in accordance with one embodiment. The depicted computer 50 includes a housing 52, a display 12, input structures 16, and input/output ports 14.

In one embodiment, the input structures 16 (such as a keyboard and/or touchpad) may be used to interact with the computer 50, such as to start, control, or operate a GUI or applications running on the computer 50. For example, a keyboard and/or touchpad may allow a user to navigate a user interface or application interface displayed on the display 12.

As depicted, the electronic device 10 in the form of the computer 50 may also include various input and output ports 14 to allow connection of additional devices. For example, the computer 50 may include an I/O port 14, such as a USB port or other port, suitable for connecting to another electronic device, a projector, a supplemental display, and so forth. The computer 50 may include network connectivity, memory, and storage capabilities, as described with respect to FIG. 1. As a result, the computer 50 may store and execute a GUI and other applications.

Figure 4:
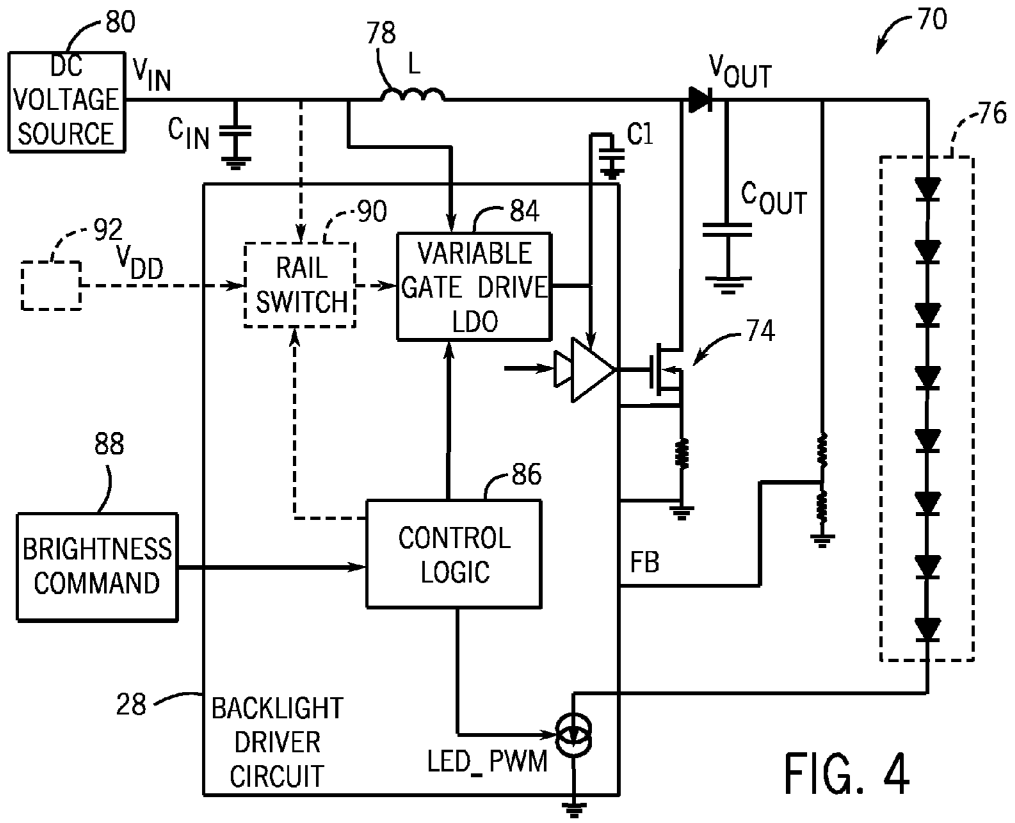
FIG. 4 is a block diagram of a boost converter in a display in the electronic device of FIG. 1, in accordance with an embodiment.

With the foregoing discussion in mind, FIG. 4 depicts a block diagram of a boost converter 70 that may be employed in the display 12 of the electronic device 10. As shown in FIG. 4, the boost converter 70 may include the backlight driver circuit 28, a switch such as a metal-oxide-semiconductor field-effect transistor (MOSFET) 74, a string of light-emitting diodes (LEDs) 76, and an inductor 78. The backlight driver circuit 28 may include control logic 86 that may control an operation of each component in the backlight drive circuit 28. For example, the control logic 86 may control how a voltage may be provided to the string of LEDs 76 via a direct current (DC) voltage source 80. In certain embodiments, the control logic 86 may be a controller, processor, microprocessor, or the like. In any case, the control logic 86 may control the brightness or amount of white light generated by the string of LEDs 76 by adjusting the voltage provided to the string of LEDs 76 using the boost converter 70. That is, the control logic 86 may control the switching of the MOSFET 74 such that the inductor 78 maintains a charge or voltage, which may be combined with the voltage from the DC voltage source 80 and provided to the string of LEDs 76.

To control the switching of the MOSFET 74, the control logic 86 may couple a gate drive voltage to the gate of the MOSFET 74 via the DC voltage source 80. In certain embodiments, the backlight driver circuit 28 may include a variable gate drive linear drop-out (LDO) regulator 84, which may receive the voltage from the DC voltage source 80. The variable gate drive LDO regulator 84 may adjust the voltage provided by the DC voltage source 80 using resistors arranged as a voltage divider, using a variable resistor, or the like. In one embodiment, the control logic 86 may be configured to provide a fixed gate drive voltage to the MOSFET 74.

The fixed gate drive voltage may be calculated based on a function designed to minimize an on-resistance $R_{ds}$(on) between the drain and the source of the MOSFET 74 when the string of LEDS 74 are operating under full-load or near full-load conditions. While operating under full-load or near full-load conditions, a significant portion of the total power loss experienced by the boost converter 70 may include energy dissipated through the on-resistance $R_{ds}$(on) of the MOSFET 74. However, when the string of LEDs 74 are not driven at full-load or near full-load conditions (e.g., during light-load condition), the total power loss experienced by the boost converter 70 may no longer be dominated by the energy dissipated through the on-resistance $R_{ds}$(on) of the MOSFET 74. Instead, the gate drive loss of the MOSFET 74 may become a more significant portion of the total power loss of the boost converter 70, as opposed to the power loss via the on-resistance $R_{ds}$(on) of the MOSFET 74.

Keeping this in mind, the gate drive loss in the boost converter 70 may be expressed by the following equation:

$$P_{gate\_loss}=C_{gate}\times V^2\times f \quad (1)$$

where $P_{gate\_loss}$ represents an amount of power loss experienced by the gate of the MOSFET 74 (gate drive loss), $C_{gate}$ represents a capacitance of the gate of the MOSFET 74, V represents the gate drive voltage provided to the gate of the MOSFET 74, and f represents a switching frequency of the MOSFET 74. In certain embodiments, to reduce the gate drive loss of the MOSFET 74 during light-load conditions, the control logic 86 may lower the gate drive voltage provided to the gate of the MOSFET 74. Although lowering the gate drive voltage may subsequently increase the on-resistance $R_{ds}$(on) of the MOSFET 74, during light-load conditions, the power loss in the MOSFET 74 via the on-resistance $R_{ds}$(on) consists of a small portion of the total power loss of the boost converter 70, as compared to the power loss due to the gate drive voltage. Accordingly, to improve the efficiency of the boost converter 70 during light-load conditions, the control logic 86 may decrease the gate drive voltage used to switch the MOSFET 74. That is, by lowering the gate drive voltage during light-load conditions, the control logic 86 may significantly reduce the gate drive loss of the MOSFET 74 since the gate drive voltage variable V is a significant contributor to the total gate drive loss $P_{gate\_loss}$, as indicated in Equation 1. In certain embodiments, to enable the MOSFET 74 to switch with lower gate drive voltages the MOSFET 74 may be a logic level MOSFET.

In one embodiment, the control logic 86 may use the variable gate drive LDO regulator 84 to lower the gate drive voltage provided to the MOSFET 74 during light-load conditions. As such, the control logic 86 may receive a brightness command 88 from the processor 18 or the like via a pulse-width modulation (PWM) duty cycle or an inter-integrated circuit (I2C) control. The brightness command 88 may indicate a brightness level or amount of white light that corresponds to a frame of image data depicted on the display 12. The brightness level indicated by the brightness command 88 may be directly related to the voltage applied to the string of LEDs 76. As such, the control logic 86 may determine a voltage value to provide to the string of LEDs 76 that corresponds to the brightness command 88. After determining this voltage value, the control logic 86 may send the resulting voltage value to the variable gate drive LDO regulator 84, which may convert a voltage received from the DC voltage source 80 such that it matches the voltage value. The resulting voltage may then be used as a gate drive voltage to the MOSFET 74. In one embodiment, the control logic 86 may determine the gate drive voltage value based on a gate drive voltage profile and the brightness level specified by the brightness command 88.

Figure 5:
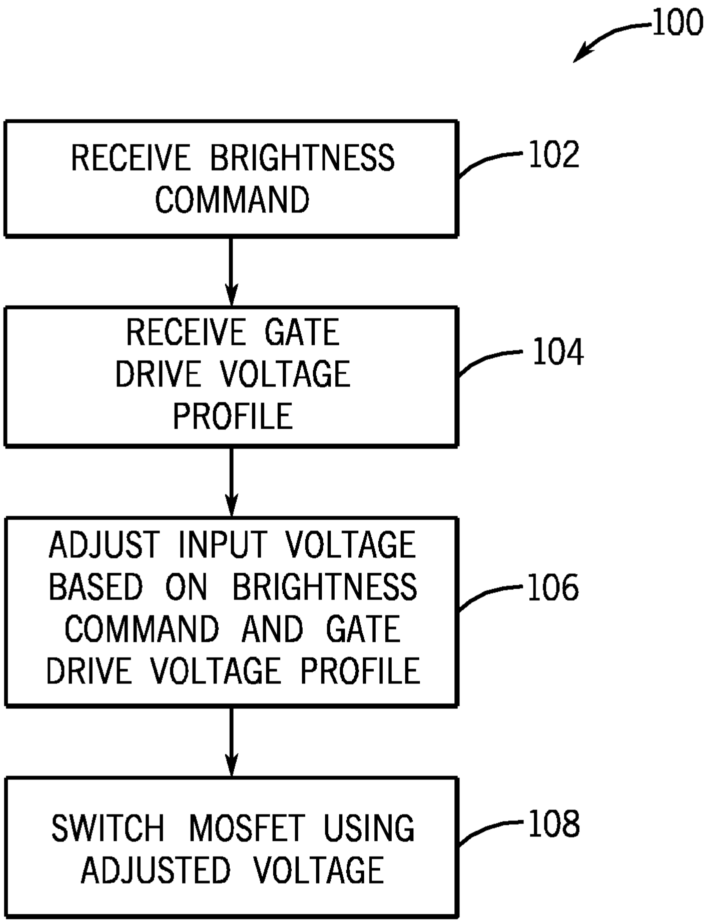
FIG. 5 is a flow chart that depicts a method for adjusting a gate drive voltage provided to a metal-oxide-semiconductor field-effect transistor (MOSFET) in the boost converter of FIG. 4, in accordance with an embodiment.

Keeping the foregoing in mind, FIG. 5 illustrates a flow chart of a method 100 for adjusting the gate drive voltage provided to the MOSFET 74 in the boost converter 70 based on the brightness command 88. At block 102, the control logic 86 may receive the brightness command 88, as described above. The brightness command 88 may indicate a percentage of the total load voltage applied to the string of LEDs 76. In one embodiment, the brightness command 88 may be received for each frame of image data depicted on the display 12.

At block 104, the control logic 86 may receive a gate drive voltage profile. The gate drive voltage profile may be based on a type of MOSFET used in the boost converter 70, an arrangement of the string of LEDs 76, and the like. Generally, the gate drive voltage profiles may be determined such that the efficiency of the boost converter 70 may be optimized according to load conditions (e.g., brightness). For instance, the gate drive voltage profiles may be designed to improve the efficiency of the boost converter 70 as a function of the load on the string of LEDs 76.

Figure 6:
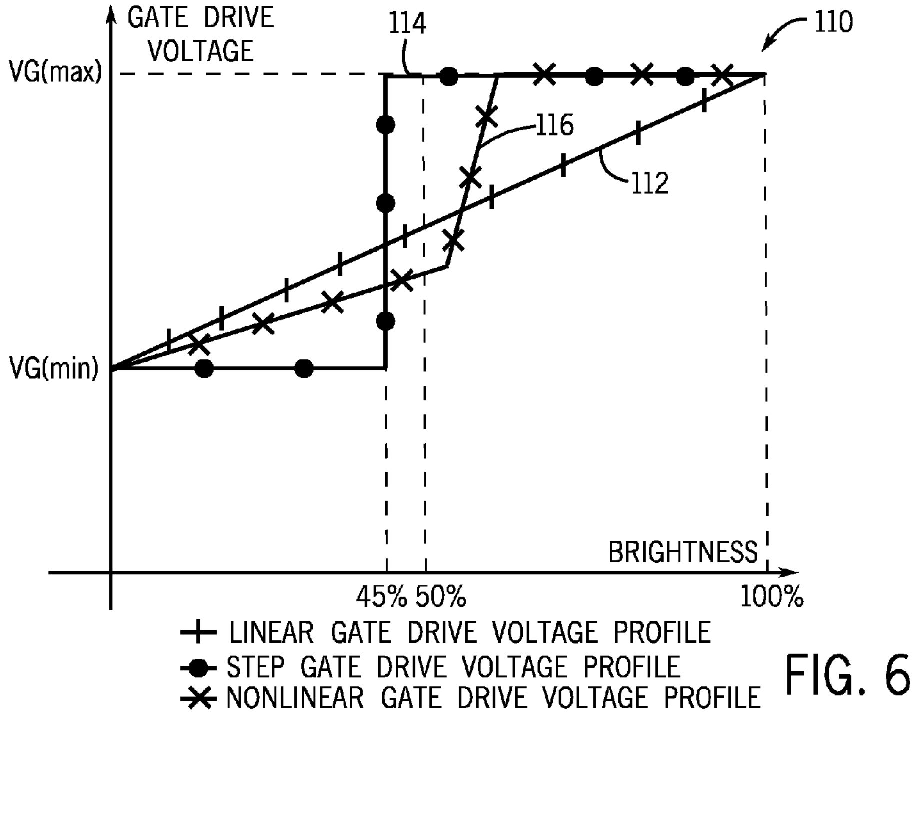
FIG. 6 is a graph of gate drive voltage profiles that may be provided to the MOSFET in the boost converter of FIG. 4, in accordance with an embodiment.

By way of example, FIG. 6 illustrates a graph 110 that depicts different gate drive voltage profiles for the MOSFET 76. Namely, the graph 110 depicts a linear gate drive voltage profile 112, a step gate drive voltage profile 114, and a non-linear gate drive voltage profile 116 that may be used to determine a gate drive voltage for the MOSFET 76 during various load conditions. Depending on various factors such as the type of MOSFET used in the boost converter 70 or the arrangement of the string of LEDs 76, a gate drive voltage profile may be defined for a respective boost converter 70 and provided to the control logic 86.

After receiving the brightness command and gate drive voltage profile, at block 106, the control logic 86 may adjust an input voltage based on the brightness command 88 and gate drive voltage profile. That is, the control logic 86 may determine a gate drive voltage for the MOSFET 74 based on an intersection between a brightness level that corresponds to the brightness command 88 and the gate drive voltage profile. For instance, referring to FIG. 6, if the brightness command 88 corresponds to a brightness level that is less than 45% and the gate drive voltage profile corresponds to the gate drive voltage profile 114, the variable gate drive LDO regulator 84 may convert the voltage received from the DC voltage source 80 such that the voltage provided to the gate of the MOSFET 74 corresponds to a minimum gate drive voltage (VG(min)) for the MOSFET 74, as indicated in the gate drive voltage profile 114.

Figure 7:
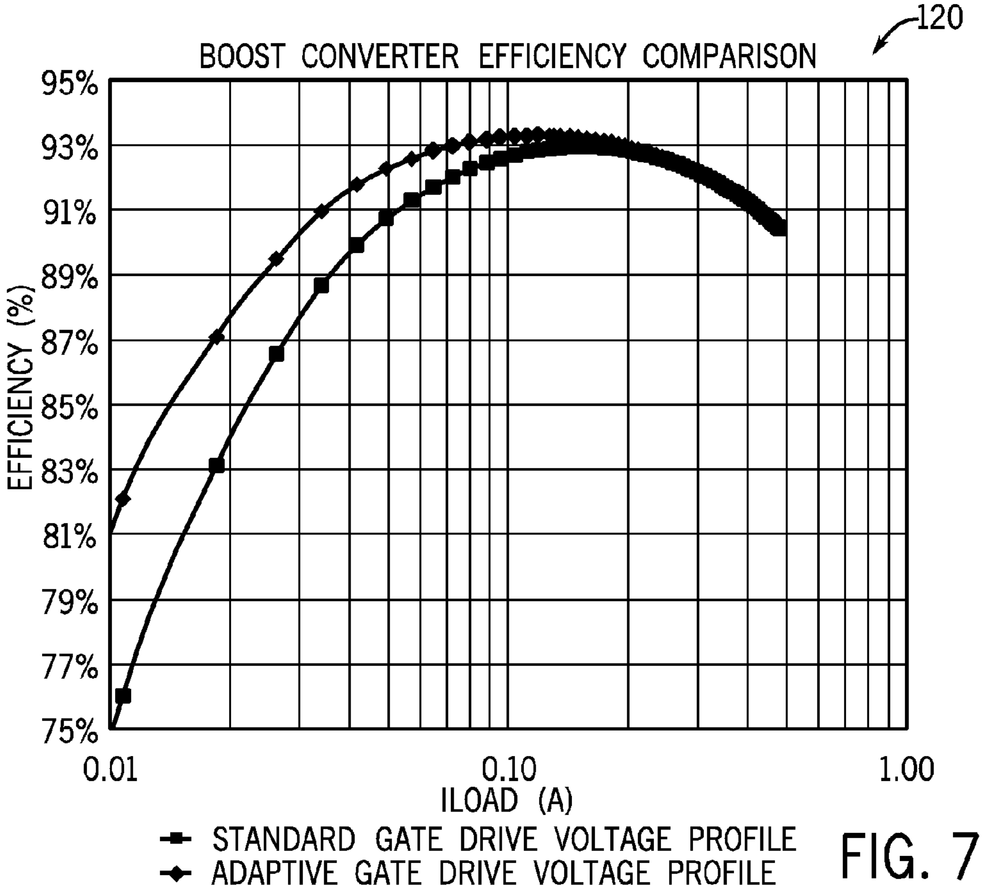
FIG. 7 is a graph of boost converter efficiency with respect to current provided to the display in the electronic device of FIG. 1, in accordance with an embodiment.

After adjusting the voltage received from the DC voltage source 80 based on the brightness command and the gate drive voltage profile, the variable gate drive LDO regulator 84 may switch the MOSFET 74 using the adjusted voltage of block 106. As a result, the control logic 86 may improve the efficiency of the boost converter 70 by decreasing gate drive losses in the MOSFET 74 during light-load conditions, as compared to using a fixed gate drive voltage for all load conditions. FIG. 7 depicts a graph 120 that compares the efficiency of the boost converter 70 operating using a standard gate drive voltage profile and an adaptive gate drive voltage profile for switching the MOSFET 74. The standard gate drive voltage profile may corresponds to a fixed gate drive voltage, whereas the adaptive gate drive voltage profile may correspond to the linear gate drive voltage profile 112 depicted in FIG. 6. As shown in the graph 120, the boost converter 70 is more efficient during light-load conditions (e.g., 0.01 A-0.10 A) when operating using the adaptive gate drive voltage profile as compared to the standard gate drive voltage profile.

Referring back to FIG. 4, in certain embodiments, the backlight driver circuit 28 may also include a rail switch component 90 that may be coupled to a DC voltage source 92 as well as the DC voltage source 80. In some embodiments, the DC voltage source 80 may have a higher DC voltage as compared to the DC voltage source 92. As such, the control logic 86 may further improve the light-load efficiency of the boost converter 70 by directing the rail switch component 90 to provide voltage to the variable gate drive LDO regulator 84 from either the low DC voltage source 80 (e.g., 5V) or the high DC voltage source 92 (e.g., 12V).

In general, the control logic 86 may further improve the light-load efficiency of the boost converter 70 by receiving the brightness command 88 and determining a load percentage of the total load voltage being applied to the string of LEDs 76 based on the brightness command 88. If the load percentage is greater than some value, the control logic 86 may send a signal to the rail switch component 90 to couple the variable gate drive LDO regulator 94 to the high DC voltage source 80. If, however, the load percentage is not greater than some value, the control logic 86 may send a signal to the rail switch component 90 to couple the variable gate drive LDO regulator 94 to the low DC voltage source 92. As such, during light-load conditions, the control logic 86 may use the low DC voltage source 92 to provide relatively low gate drive voltages to the MOSFET 74. As a result, the control logic 86 may decrease the power loss experienced by the variable gate drive LDO regulator 84 when adjusting the high DC voltage source 80 into relatively low DC voltages to provide as gate drive voltages.

Figure 8:
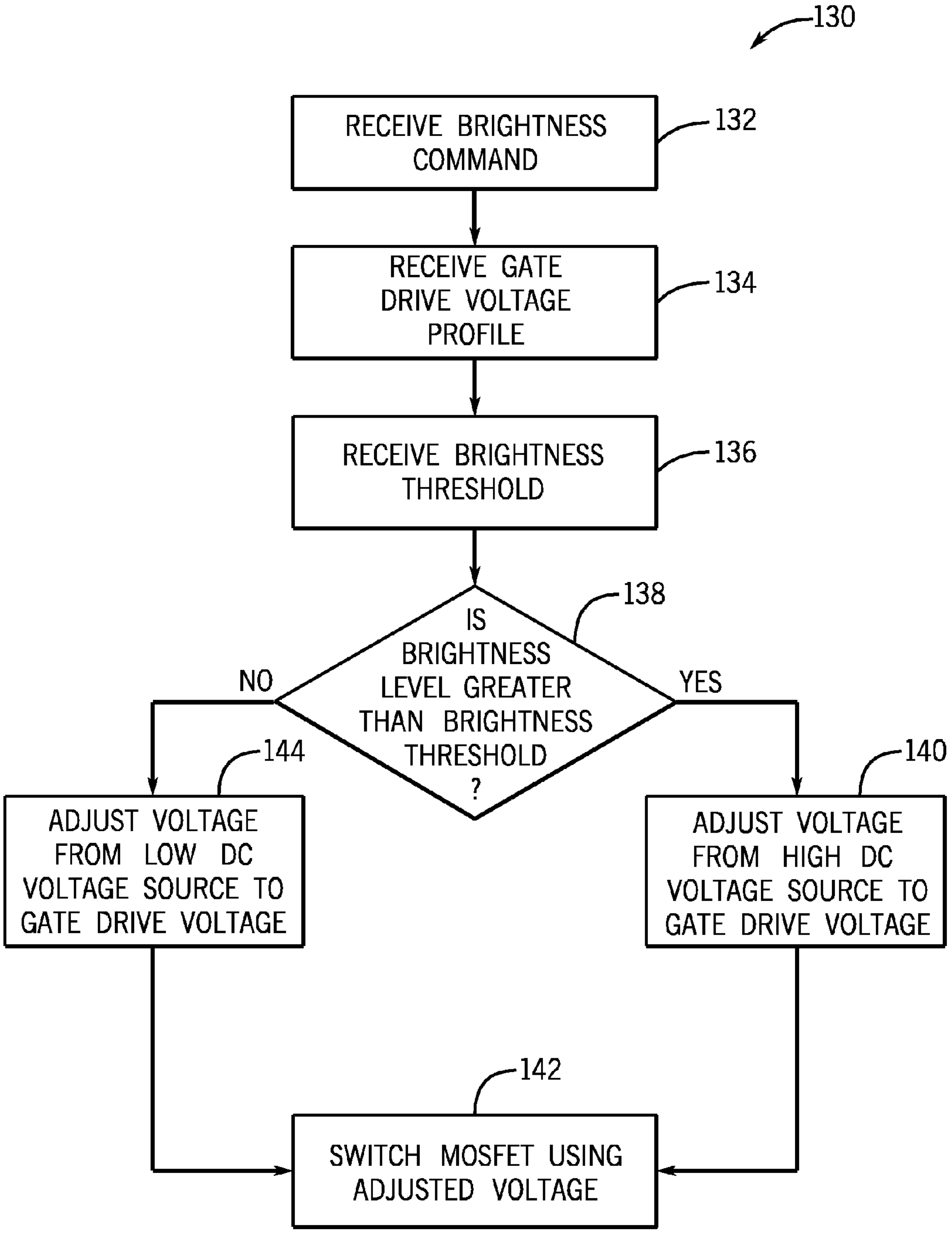
FIG. 8 is a flow chart that depicts a method for adjusting a gate drive voltage provided to the MOSFET in the boost converter of FIG. 4 using two voltage sources, in accordance with an embodiment.

Keeping this in mind, FIG. 8 illustrates a flow chart of a method 130 for adjusting the gate drive voltage provided to the MOSFET 74 in the boost converter 70 based on the brightness command 88 and using two DC voltage sources. At block 132 and block 134, the control logic 86 may receive the brightness command 88 and a gate drive voltage profile, as described above with respect to block 102 and block 104 of FIG. 5. In addition to these inputs, at block 136, the control logic 86 may receive a brightness threshold that may correspond to a brightness level or load percentage for the string of LEDs 76. The brightness threshold may be determined based on efficiency characteristics of the voltage gate drive LDO regulator 84 with respect to its voltage outputs.

At block 138, the control logic 86 may determine whether the brightness level that corresponds to the brightness command 88 is greater than the brightness threshold. If the brightness level is greater than the brightness threshold, the control logic 86 may proceed to block 140. At block 140, the control logic 86 may convert an input voltage from the high DC voltage source 80 to a gate drive voltage based on the brightness command 88 and the gate drive voltage profile, as discussed above with respect to block 108 of FIG. 5. That is, the control logic 86 may send a signal to the rail switch 90 to couple the high DC voltage source 80 to the variable gate drive LDO regulator 84 and send a signal to the variable gate drive LDO regulator 84 to convert the voltage received from the rail switch 90 into the gate drive voltage. The control logic 86 may then proceed to block 142 and send a signal to the variable gate drive LDO regulator 84 to switch the MOSFET 74 using the adjusted voltage determined at block 140.

If, however, the control logic 86 determines that the brightness level is not greater than the brightness threshold, the control logic 86 may proceed to block 144. At block 144, the control logic 86 may adjust an input voltage from the low DC voltage source 92 to a gate drive voltage based on the brightness command 88 and the gate drive voltage profile, as discussed above with respect to block 108 of FIG. 5. That is, the control logic 86 may send a signal to the rail switch 90 to couple the low DC voltage source 92 to the variable gate drive LDO regulator 84 and send a signal to the variable gate drive LDO regulator 84 to convert the voltage received from the rail switch 90 into the gate drive voltage. The control logic 86 may then proceed to block 142 and send a signal to the variable gate drive LDO regulator 84 to switch the MOSFET 74 using the adjusted voltage determined at block 144.

Figure 9:
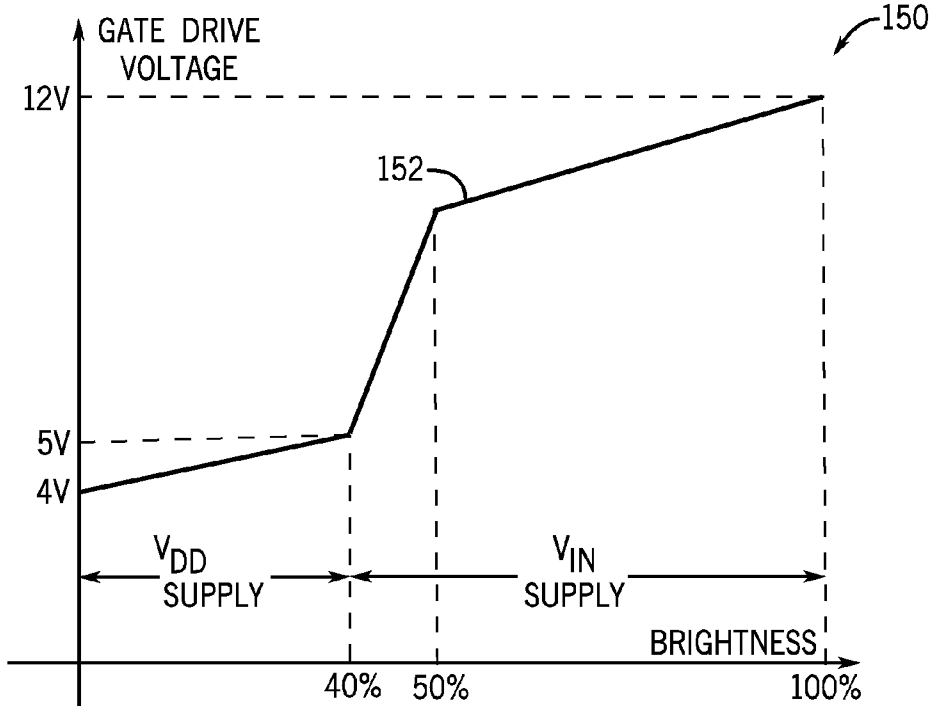
FIG. 9 is a graph of a gate drive voltage profile that may be provided to the MOSFET in the boost converter of FIG. 4 using the method of FIG. 8, in accordance with an embodiment.

Keeping the foregoing in mind, FIG. 9 illustrates a graph 150 of an example flexible gate drive voltage profile 152 as a function of brightness. If the brightness threshold of block 136 is 40%, the control logic 86 may use the input voltage $V_{IN}$ from the high DC voltage source 80 to provide a range of gate drive voltages between 5V and 12V. In the same manner, the control logic 86 may use the input voltage $V_{DD}$ from the low DC voltage source 92 to provide a range of gate drive voltages between 4V and 5V.

By using the high DC voltage source 80 to provide the gate drive voltages to the MOSFET 74 for higher load conditions and the low DC voltage source 92 to provide the gate drive voltages to the MOSFET 74 for lighter load conditions, the control logic 86 may further improve the efficiency of the boost converter 70. That is, the control logic 86 may use the high DC voltage source 80 to provide the MOSFET 74 with a first range of gate drive voltages and the low DC voltage source to provide the MOSFET 74 with a second range of gate drive voltages such that the power loss of the variable gate drive LDO regulator 84 may be improved from using the high DC voltage source 80 to provide the MOSFET 74 with gate drive voltages encompassing both ranges of gate drive voltages. For instance, the variable gate drive LDO regulator 84 may dissipate a significantly larger amount of energy via its resistors when adjusting a 12V DC voltage (i.e., from the high DC voltage source 80) to a 4V DC voltage as compared to adjusting a 5V DC voltage (i.e., from the low DC voltage source 92) to the 4V DC voltage.

Figure 10:
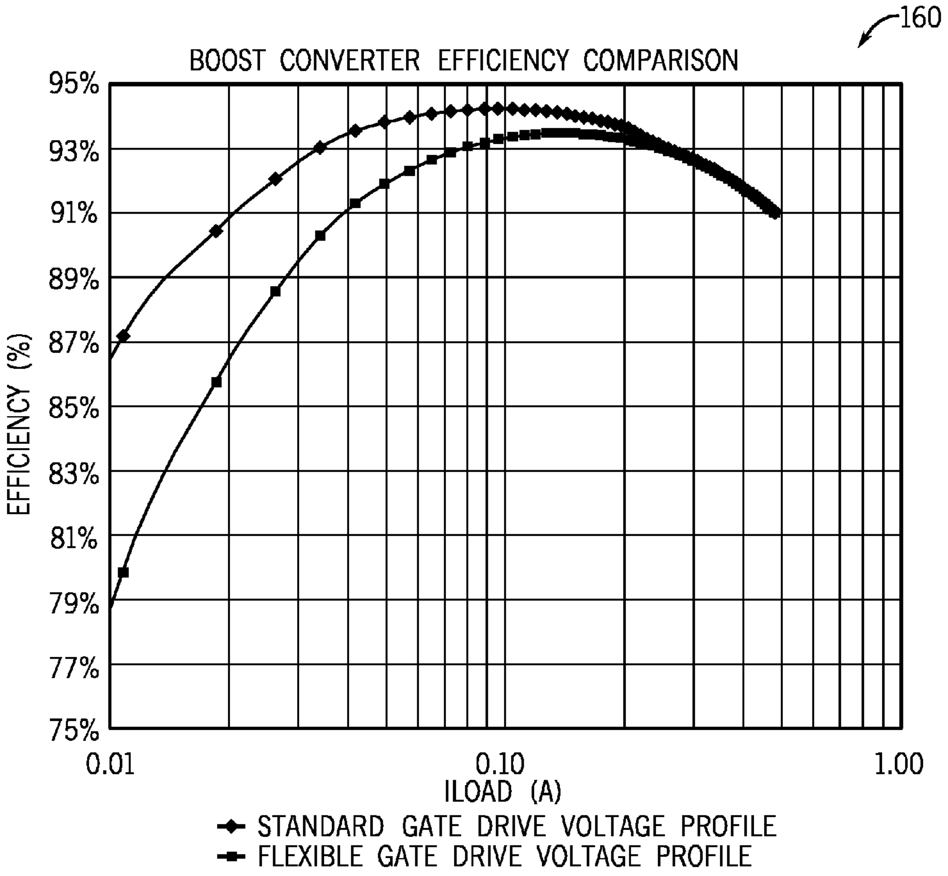
FIG. 10 is a graph of boost converter efficiency with respect to current provided to the display in the electronic device of FIG. 1, in accordance with an embodiment.

The improved efficiency of the boost converter 70 is illustrated in a graph 160 of FIG. 10. The graph 160 illustrates a comparison of the efficiency of the boost converter 70 operating using a standard gate drive voltage profile and a flexible gate drive voltage profile for switching the MOSFET 74 as described above with respect to the method 130. The standard gate drive voltage profile may be a fixed gate drive voltage as discussed above, and the flexible gate drive voltage profile may correspond to the flexible gate drive voltage profile 152 of FIG. 9. As shown in the graph 160, the boost converter is more efficient during light-load conditions (e.g., 0.01 A-0.10 A) when operating using the flexible gate drive voltage profile as compared to the standard gate drive voltage profile.

In certain embodiments, since the brightness command 88 may be passed through a PWM duty cycle control or I2C control, the load condition for the string of LEDs 76 may be known prior to the load actually being applied to the string of LEDs 76. As such, the control logic 86 may have a sufficient amount of time to change the gate drive voltage provided to the MOSFET 74 using the rail switch 90 and the variable gate drive LDO regulator 84. However, to further increase the response time of the backlight driver circuit 28, the control logic 86 may bypass switching between DC voltage sources when a transition between two brightness levels for two consecutive frames of image data is greater than some threshold.

Figure 11:
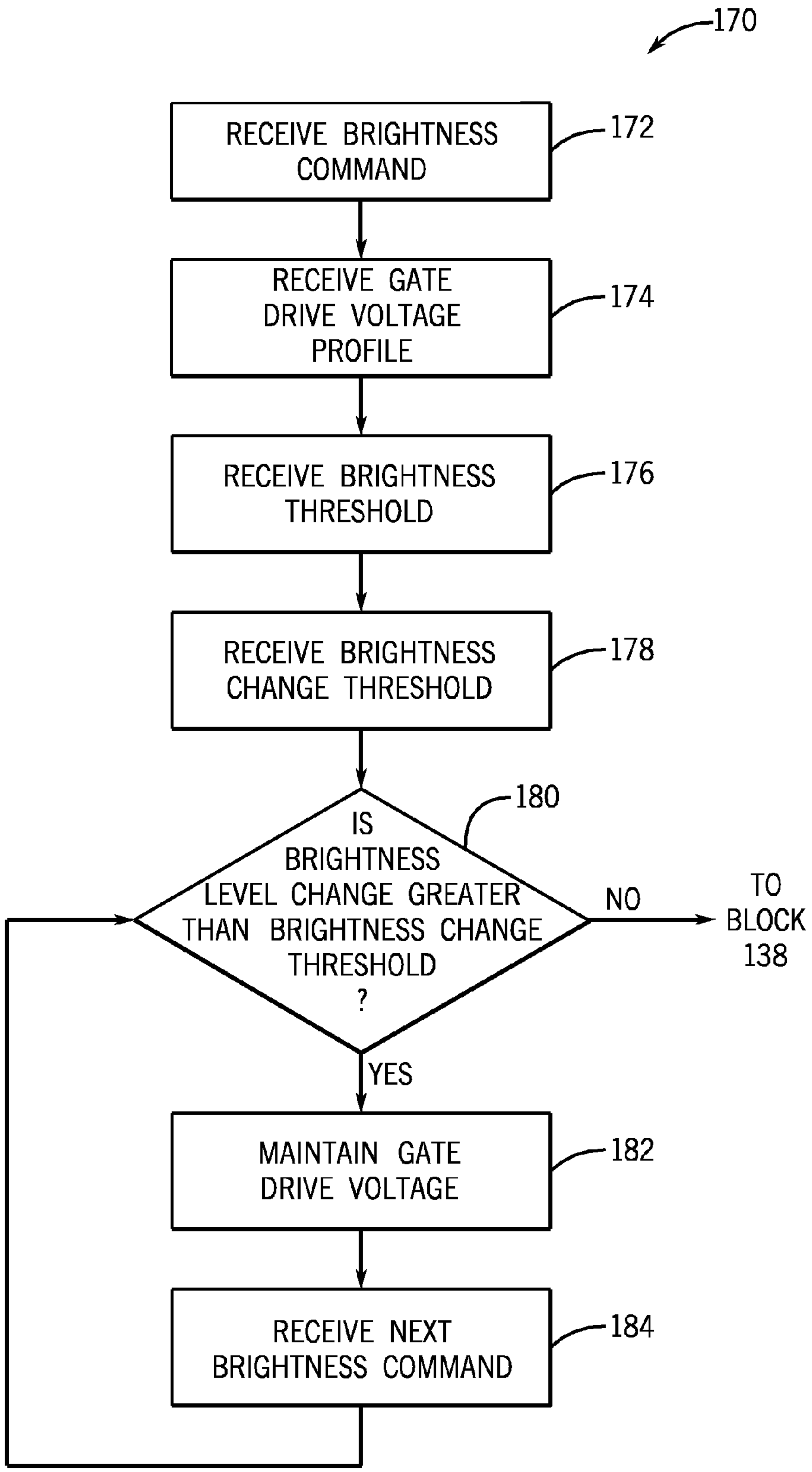
FIG. 11 is a flow chart that depicts a method for adjusting a gate drive voltage provided to the MOSFET in the boost converter of FIG. 4 using two voltage sources and based in part on a change in brightness levels that occur in the display of the electronic device of FIG. 1, in accordance with an embodiment.

For example, FIG. 11 illustrates a flow chart of a method 170 for bypassing the switching between DC voltage sources when a transition between two brightness levels for two consecutive frames of image data is greater than some threshold. At block 172, block 174, and block 176, the control logic 86 may receive the brightness command 88, the gate drive voltage profile, and the brightness threshold as described above. At block 178, the control logic 86 may receive a brightness change threshold, which may correspond to a significant load change that may cause the control logic 74 to switch DC voltage sources to provide the MOSFET its corresponding gate drive voltage as discussed above.

At block 180, the control logic 86 may determine whether the brightness level change between the current brightness level, as indicated by the brightness command 88, and the previous brightness level is greater than the brightness change threshold. If the brightness level change is greater than the brightness change threshold, the control logic 86 may not determine a new gate drive voltage. That is, the control logic 86 may proceed to block 182 and continue switching the MOSFET 74 using the same gate drive voltage used previously. The control logic 86 may then, at block 184, receive the next brightness command 88 and return to block 180.

If, however, the brightness level change is not greater than the brightness change threshold at block 180, the control logic 86 may proceed to block 138 in the method 130 of FIG. 8. That is, the control logic 86 may switch the MOSFET 74 using a gate drive voltage that may be obtained from the high DC voltage source 80 or the low DC voltage 92 as described above. As such, once the load condition of the string of LEDs 76 is in a steady-state or near steady-state condition, the control logic 86 may resume operating the boost converter 70 efficiently as per the method 130 described above with respect to FIG. 8.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A boost converter, comprising:

a first direct current (DC) voltage source;

a second direct current voltage source;

an inductor configured to couple to the first DC voltage source and to a plurality of light-emitting diodes (LEDs) configured to provide a backlight to a display;

a metal-oxide-semiconductor field-effect transistor (MOSFET) configured to couple to the inductor; and a backlight driver circuit configured to couple to the first DC voltage source, the second DC voltage source, and the MOSFET, wherein the backlight driver circuit comprises:

a rail switch configured to switch between the first DC voltage source and the second DC voltage source;

control logic configured to:

determine a gate drive voltage to switch the MOSFET based at least in part on a load that corresponds to the plurality of LEDs;

send a signal to the rail switch to couple to either the first DC voltage source or the second DC voltage source based at least in part on the load;

a linear drop-out (LDO) regulator configured to couple to the rail switch and to the control logic, wherein the LDO regulator is configured to:

convert a voltage output by the rail switch to the gate drive voltage; and couple the gate drive voltage to the MOSFET when the MOSFET switches.

2. The boost converter of claim 1, wherein the MOSFET is a logic level MOSFET.

3. The boost converter of claim 1, wherein the control logic is configured to determine the gate drive voltage by determining a voltage that corresponds to an intersection of the load on a gate drive voltage profile, wherein the gate drive voltage profile comprises a voltage curve as a function of the load.

4. The boost converter of claim 3, wherein the voltage curve is a linear curve, a step curve, or a non-linear curve.

5. The boost converter of claim 3, wherein the gate drive voltage profile is determined based at least in part on a type of the MOSFET, an arrangement of the plurality of LEDs, or a combination thereof.

6. The boost converter of claim 3, wherein the gate drive voltage profile is configured to increase an efficiency of the boost converter as a function of the load.

7. A system, comprising:

a first direct current (DC) voltage source configured to output a first voltage;

a second (DC) voltage source configured to output a second voltage;

an inductor configured to couple to the first DC voltage source;

a plurality of light-emitting diodes (LEDs) configured to couple to the inductor and configured to provide a backlight to a display;

a metal-oxide-semiconductor field-effect transistor (MOSFET) configured to couple to the inductor; and a backlight driver circuit comprising:

a rail switch configured to couple to the first DC voltage source and to the second DC voltage source;

a linear drop-out (LDO) regulator configured to couple to the rail switch and the MOSFET; and control logic configured to:

determine a gate drive voltage amplitude to switch the MOSFET based at least in part on a brightness command that corresponds to a load of the plurality of LEDs;

send a first signal to the LDO regulator to convert the first voltage to the gate drive voltage amplitude when the brightness command is greater than a brightness threshold, wherein the rail switch is configured to couple the first DC voltage source to the LDO regulator; or send a second signal to the LDO regulator to convert the second voltage to the gate drive voltage amplitude when the brightness command is not greater than the brightness threshold, wherein the rail switch is configured to couple the second DC voltage source to the LDO regulator; and send a third signal to the LDO regulator to couple the gate drive voltage amplitude to the MOSFET when the MOSFET switches.

8. The system of claim 7, wherein the first DC voltage source is configured to output a higher voltage as compared to the second DC voltage source.

9. The system of claim 7, wherein the control logic receives a plurality of brightness commands that corresponds a plurality of image frames.

10. The system of claim 7, wherein the brightness command corresponds to a percentage of a total load applied to the plurality of LEDs.

11. The system of claim 7, wherein the control logic receives the brightness command via a pulse-width modulation (PWM) duty cycle, an inter-integrated circuit (I2C), or a combination thereof.

12. The system of claim 7, wherein the brightness threshold is determined based at least in part on efficiency characteristics of the LDO regulator.

13. A backlight driver circuit comprising:

a rail switch configured to switch between a high voltage source and a low voltage source;

a linear drop-out (LDO) regulator configured to couple to the high voltage source or the low voltage source via the rail switch; and a processor configured to:

receive a brightness command that corresponds to a percentage of a total load applied to a plurality of light-emitting diodes (LEDs) configured to provide a backlight to a display;

determine a gate drive voltage that corresponds to a metal-oxide-semiconductor field-effect transistor (MOSFET) configured to control a voltage applied to the plurality of LEDs based at least on the brightness command;

send a first signal to the rail switch to switch to the high voltage source when the brightness command is greater than a brightness threshold; or send a second signal to the rail switch to switch to the low voltage source when the brightness command is not greater than the brightness threshold; and send a third signal to the LDO regulator to convert a voltage output by the high voltage source or the low voltage source into the gate drive voltage and to couple the gate drive voltage to the MOSFET.

14. The backlight driver circuit of claim 13, wherein the LDO regulator is configured to convert the voltage output using a voltage divider, a variable resistor, or a combination thereof.

15. The backlight driver circuit of claim 13, wherein the processor configured to determine the gate drive voltage by:

receiving a gate drive voltage profile that corresponds to the MOSFET;

determining the percentage of the total load applied to the plurality of LEDs based at least in part on the brightness command; and identifying the gate drive voltage based at least in part on an intersection between the percentage of the total load and the gate drive voltage profile.

16. The backlight driver circuit of claim 15, wherein the gate drive voltage profile is configured to decrease power loss of the MOSFET when the brightness command is not greater than the brightness threshold.

17. A method, comprising:

receiving, using a processor, a first brightness command that corresponds to a percentage of a total load applied to a plurality of light-emitting diodes (LEDs) in a first frame of image data;

determining a first gate drive voltage amplitude to switch a metal-oxide-semiconductor field-effect transistor (MOSFET) in a boost converter coupled to the plurality of LEDs, wherein the first gate drive voltage amplitude is determined based at least in part on the first brightness command;

receiving a second brightness command that corresponds to a second frame of the image data;

determining whether a change between the first brightness command and the second brightness command is greater than a brightness change threshold;

switching the MOSFET using the first gate drive voltage amplitude when the change between the first brightness command and the second brightness command is greater than the brightness change threshold; or switching the MOSFET using a second gate drive voltage amplitude when the change between the first brightness command and the second brightness command is not greater than the brightness change threshold, wherein the second gate drive voltage amplitude is different from the first gate drive voltage amplitude.

18. The method of claim 17, comprising switching the MOSFET using the first gate drive voltage amplitude until the brightness change between two subsequently received brightness commands is not greater than the brightness change threshold.

19. The method of claim 17, wherein switching the MOSFET using the second gate drive voltage amplitude comprises:

determining the second gate drive voltage amplitude based at least in part on the brightness command;

converting a first voltage from a first voltage source to the second gate drive voltage amplitude when the brightness command is greater than a brightness threshold; or converting a second voltage from a second voltage source to the second gate drive voltage amplitude when the brightness command is not greater than the brightness threshold; and switching the MOSFET using the converted first voltage or the converted second voltage.

20. An electronic device comprising:

a display configured to display image data, wherein the display comprises:

a first direct current (DC) voltage source configured to output a first voltage;

a second DC voltage source configured to output a second voltage;

a plurality of light-emitting diodes (LEDs) configured to provide a backlight to the display; and a backlight driver circuit comprising:

a rail switch configured to couple to the first DC voltage source and to the second DC voltage source;

a linear drop-out (LDO) regulator configured to couple to the rail switch and a metal-oxide-semiconductor field-effect transistor (MOSFET) configured to adjust voltage provided to the plurality of LEDs; and control logic configured to adjust a gate drive voltage provided to the MOSFET using the rail switch and the LDO regulator based at least in part on the voltage provided to the plurality of LEDs.

21. The electronic device of claim 20, wherein the control logic is configured to adjust the gate drive voltage by:

sending a first signal to the rail switch to couple the first DC voltage source to the LDO regulator when the brightness command is greater than a brightness threshold; or sending a second signal to the rail switch to couple the second DC voltage source to the LDO regulator when the brightness command is not greater than a brightness threshold.

22. The electronic device of claim 21, wherein the control logic is configured to adjust the gate drive voltage by:

sending a third signal to the LDO regulator to convert the first voltage to the gate drive voltage when the brightness command is greater than the brightness threshold; or sending a fourth signal to the LDO regulator to convert the second voltage to the gate drive voltage when the brightness command is not greater than the brightness threshold.

* * * * *